Patented Aug. 5, 1947

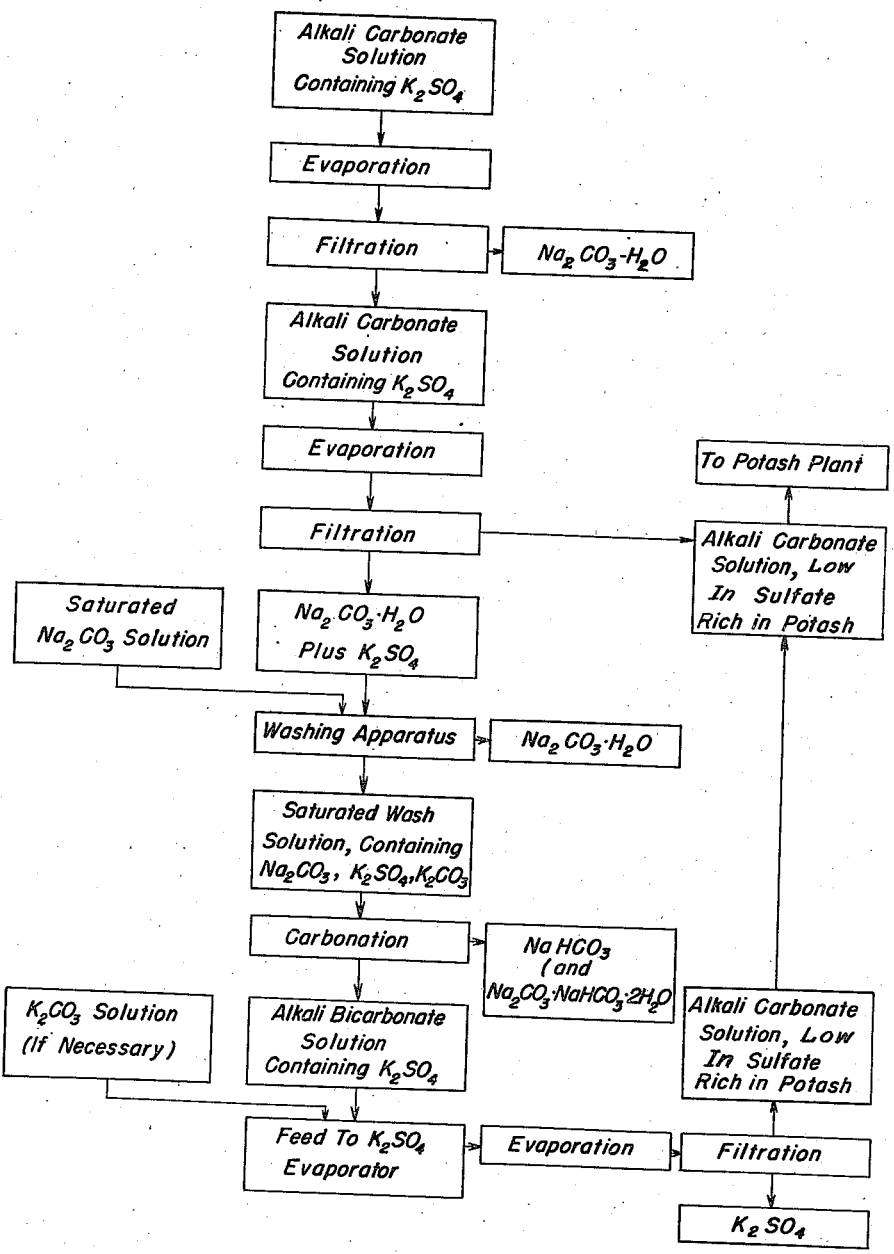

2,424,975

UNITED STATES PATENT OFFICE 2,424,975

PROCESS FOR SEPARATING POTASSIUM SULFATE FROM ALKALI CARBONATES

Guy Ervin, Jr., College Park, Md., assignor to Government of the United States, as represented by the Secretary of the Interior Application September 15, 1943, Serial No. 502,452

2 Claims. (Cl. 23—63)

(Granted under the act of March 3, 1883, as amended April 30, 1928; 370 O. G. 757)

The invention described herein may be manufactured and used by or for the Government of the United States for governmental purposes without the payment to me of any royalty thereon in accordance with the provisions of the act of April 30, 1928, (Ch. 460, 45 Stat. L. 467).

This invention relates to the separation of alkali metal sulphates from mixtures thereof with alkali metal carbonates, and more particularly to the separation of potassium sulphate from a mixture of sodium and potassium carbonates secured by the extraction of the mineral wyomingite with an aqueous solution of calcined trona.

Wyomingite is a potash-containing mineral found in the State of Wyoming and it has previously been proposed to recover the potash content by extraction with an aqueous solution of sodium carbonate, such as may be obtained by the calcination of natural trona. In this extraction, an aqueous brine is secured which contains a large amount of sodium carbonate, a moderate amount of potassium carbonate, and a small amount of potassium sulphate. It might be expected that since potassium carbonate is the most soluble salt in the ternary mixture, and since sodium carbonate is the least soluble salt in said mixture, that one could separate the mixture into its components by simple fractional crystallization. However, it is found that the mixture cannot be completely separated by this means since the potassium sulphate present tends to contaminate both the sodium carbonate and the potassium carbonate. In the industrial arts it is highly desirable that the potassium sulphate be separated from both the sodium carbonate and the potassium carbonate, since it exerts a deleterious influence, particularly in the glass making art.

In view of the foregoing and other considerations, it is therefore an object of the present invention to separate a ternary salt mixture containing sodium carbonate, potassium carbonate and potassium sulphate into its individual components. More broadly, the invention has for an object the separation of alkali metal sulphate from a mixture of alkali metal carbonates. Another object is to remove small quantities of potassium sulphate from a mixture of potassium carbonate and sodium carbonate. A further object is to remove potassium sulphate from a brine secured by the extraction of wyomingite with an aqueous solution of calcined trona. A still further object is to remove potassium sulphate in the crystallized form from a mixture of sodium and potassium carbonates by a continuous process involving substantially no losses of materials.

The above and other objects hereinafter apparent are accomplished in accordance with this invention wherein alkali metal sulphate is removed from a mixture containing potassium carbonate and sodium carbonate by evaporating an aqueous solution of such a mixture to crystallize the potassium sulphate in admixture with the sodium carbonate, then washing the sulphate out of the crystalline residue with a saturated solution of sodium carbonate, carbonating the sulphate-containing wash liquor to reduce the concentration of sodium carbonate by precipitating bicarbonate and trona, then filtering and adding potassium carbonate to the filtrate to secure a solution of sulphate in a concentrated solution of potassium carbonate, and finally separating by evaporative crystallization the potassium sulphate to yield a substantially sulphate-free solution of alkali metal carbonate for further working up. In the separation, advantage is taken of the fact that the alkali metal sulphate will precipitate in crystalline form with the sodium carbonate, and then the alkali metal sulphate can be selectively removed from the sodium carbonate by washing the mixed crystalline precipitate with a saturated solution of sodium carbonate. Advantage is also taken of the fact that a saturated solution of sodium carbonate containing a small amount of potassium sulphate can be depleted of its sodium carbonate content by saturating the solution with carbon dioxide gas, generally at an elevated temperature of the order of 45 to 65 degrees centigrade, and preferably at a temperature within the more restricted range of 50 to 55 degrees centigrade. The carbonation produces a mixture of sodium bicarbonate crystals with the double salt of sodium carbonate and sodium bicarbonate known as trona. In the process advantage is further taken of the fact that potassium sulphate will cleanly crystallize from potassium carbonate solution without the troublesome formation of glaserite, a double salt. The more concentrated the potassium carbonate solution, the more complete is the precipitation of potassium sulphate upon evaporative crystallization, and the sulphate content of such a solution can be reduced to as low as 0.1 percent by weight or less.

Having in mind the foregoing factors influencing the invention, it will best be understood by an explanation of the sequence of operation employed, taken in conjunction with the accompanying drawing which is in the form of a diagrammatic flow sheet. The brine solution from a typical extraction of wyomingite with aqueous sodium carbonate solution is first subjected to a preliminary evaporative crystallization at temperatures at least as high as 35 degrees centigrade, and preferably at the boiling point of the solution, to crystallize as a commercially-pure preliminary product, monohydrated sodium carbonate. The preliminary crystallization is continued to the point at which potassium sulphate also begins to crystallize; generally this point is reached when the solution contains about two parts by weight of potassium carbonate per part by weight of sodium carbonate. At this point the initial crystalline precipitate of sodium carbonate is removed from the solution, as by filtration, and thereafter the crystallization is repeated at a temperature of at least 35 degrees centigrade and preferably at a temperature of the order of 100 degrees centigrade, the approximate boiling point of the solution. The second crystallization is continued until substantially all of the potassium sulphate is crystallized out of the mother liquor together with most of the residual sodium carbonate, leaving most of the potassium carbonate in a liquor substantially free from potassium sulphate which can be sent directly to a potash recovery plant (where the potassium carbonate is separated from remaining small amounts of sodium carbonate by means known to the art). The potassium sulphate-containing crystalline precipitate is then washed at an elevated temperature, generally between 30° centigrade and 75° centigrade, and preferably at a temperature within the more restricted range of 55° centigrade to 65° centigrade, with an approximately saturated solution of sodium carbonate to selectively dissolve out all of the potassium sulphate together with any adhering potassium carbonate, leaving a second portion of commercially pure monohydrated sodium carbonate. The wash solution thus contains all of the potassium sulphate together with any potassium carbonate which adheres to the initial crystalline precipitate, and is likewise saturated with sodium carbonate. Only a minimum amount of wash solution is employed sufficient to dissolve all of the potassium sulphate and in general from about 0.5 part by weight to about 0.75 part by weight of wash solution is required per part by weight of wet cake. After washing, the wash solution is saturated with carbon dioxide at an elevated temperature, preferably of the order of 50° to 55° centigrade, whereupon a large proportion of the sodium salts is precipitated as sodium bicarbonate with the double salt of sodium carbonate and sodium bicarbonate shown as trona. At this point the crystalline precipitate is filtered from the sulphate-containing solution, preferably at a temperature of the order of 20° to 25° centigrade, and a sufficient amount of potassium carbonate is added to the solution to prevent the formation of glaserite upon subsequent evaporative crystallization. Preferably, the potassium carbonate is added in the form of an approximately saturated aqueous solution and it has been found that about 0.5 part to 0.75 part by weight of 40% potassium carbonate solution per part by weight of wash liquor is usually sufficient. Occasionally, such a large amount of potassium carbonate is carried into the sodium carbonate wash solution from the above-described redissolution step, that it is unnecessary to add potassium carbonate solution at this point. However, as above mentioned, the greater the concentration of potassium carbonate in relation to the concentration of potassium sulphate, the cleaner is the subsequent separation now to be described. After adjusting the potassium carbonate concentration, the solution is subjected to a third evaporative crystallization, preferably under vacuum at a temperature of the order of 75 degrees centigrade, until substantially all of the contained potassium sulphate has been precipitated in crystalline form, and it can then be removed preferably by filtratiton or decantation to leave a substantially sulphate-free solution of potassium carbonate for further working up in the potash plant.

The following examples illustrate how the invention may be carried out, but it is not limited thereto. Parts and percentage compositions given are by weight unless otherwise designated.

*Example 1*

A solution having the composition, 20% sodium carbonate ($Na_2CO_3$), 10% potassium carbonate ($K_2CO_3$), and 0.5% potassium sulfate ($K_2SO_4$), was evaporated at 100° C. until the solution reached the composition, 20% sodium carbonate ($Na_2CO_3$), 20% potassium carbonate ($K_2CO_3$), and 1.0% potassium sulfate ($K_2SO_4$); and the sodium carbonate monohydrate ($Na_2CO_3.H_2O$) which crystallized out was filtered off. The filtrate was then evaporated further at 100° C. until the composition of the solution reached 44% potassium carbonate ($K_2CO_3$), 9% sodium carbonate ($Na_2CO_3$); and 0.1% potassium sulfate ($K_2SO_4$), and the crystallized sodium carbonate monohydrate ($Na_2CO_3.H_2O$) and potassium sulfate ($K_2SO_4$) were filtered off. The wet cake of sodium carbonate monohydrate and potassium sulfate ($K_2SO_4$), containing 10% of mother liquor on a dry basis, was washed at 60° C. in a countercurrent decantation apparatus with an amount of 30% sodium carbonate ($Na_2CO_3$) solution equal to 0.69 times the weight of the wet cake. The sodium carbonate ($Na_2CO_3$) produced by calcination of the washed product contained only 0.1% of $K_2O$ and 0.05% of $SO_3$. The effluent wash-solution was carbonated at 55° C., the mixture of sodium bicarbonate and trona was removed by filtration at 25° C. and calcined to give sodium carbonate ($Na_2CO_3$) containing only 0.1% $K_2O$ and 0.05% $SO_3$. The filtrate was mixed with 40% potassium carbonate ($K_2CO_3$) solution in the proportion of 0.624 parts of potassium carbonate ($K_2CO_3$) solution to one part of filtrate and evaporated at 75° C. until the composition of the solution was 45.8% potassium carbonate ($K_2CO_3$), 7.4% sodium carbonate ($Na_2CO_3$), and 0.1% potassium sulfate ($K_2SO_4$). The potassium sulfate ($K_2SO_4$) which crystallized was removed by filtration and found to contain only 0.6% $Na_2O$ and 1% $CO_2$.

*Example 2*

A solution having the composition, 15.0% sodium carbonate ($Na_2CO_3$), 7.1% potassium carbonate ($K_2CO_3$) and 0.68% potassium sulfate ($K_2SO_4$) was evaporated at the atmospheric boiling point, until the solution reached the composition 21.7% sodium carbonate ($Na_2CO_3$), 23.9% potassium carbonate ($K_2CO_3$) and 2.3% potassium sulfate ($K_2SO_4$). The monohydrated sodium carbonate ($Na_2CO_3.H_2O$) which crystallized out was filtered off, washed twice with equal parts of 30 percent sodium carbonate ($Na_2CO_3$) solution, and found to contain only 0.07 percent $SO_3$. This filtrate was evaporated again at the atmospheric boiling point until the composition of the solution reached 42.3% potassium carbonate ($K_2CO_3$), 9.3% sodium carbonate ($Na_2CO_3$), and 0.2% potassium sulfate ($K_2SO_4$), then the crystallized sodium carbonate monohydrate ($Na_2CO_3.H_2O$) and potassium sulfate ($K_2SO_4$) was filtered off. The resulting wet cake of sodium carbonate monohydrate ($Na_2CO_3.H_2O$) and potassium sulfate ($K_2SO_4$), containing 20% of mother liquor on a dry basis, was washed at 75° C. in a countercurrent decantation apparatus with an amount of 29% sodium carbonate ($Na_2CO_3$) solution equal to 0.75 times the weight of the wet cake. The sodium carbonate ($Na_2CO_3$) produced by calcination of the washed product contained only 0.15% $K_2O$ and 0.1% $SO_3$. The effluent wash solution was carbonated at 50° C., the precipitated mixture of sodium bicarbonate and trona removed by filtration at 30° C. and the filter cake calcined to give sodium carbonate ($Na_2CO_3$) containing only 0.1% $K_2O$ and 0.5% $SO_3$. The filtrate was evaporated at 60° C. until the composition of the solution was 25.8% potassium carbonate ($K_2CO_3$), 16.4% sodium carbonate ($Na_2CO_3$) and 1.0% potassium sulfate ($K_2SO_4$). The potassium sulfate ($K_2SO_4$) which then crystallized was removed by filtration and found to contain only 0.5% $Na_2O$ and 0.8% $CO_2$.

*Example 3*

A solution having the composition 21.1% sodium carbonate ($Na_2CO_3$), 9.5% potassium carbonate ($K_2CO_3$), and 3.4% potassium sulfate ($K_2SO_4$) was evaporated at the atmospheric boiling point until the solution reached the composition 14.9% sodium carbonate ($Na_2CO_3$), 26.1% potassium carbonate ($K_2CO_3$) and 1.0% potassium sulfate ($K_2SO_4$), whereupon the crystallized sodium carbonate monohydrate ($Na_2CO_3.H_2O$) and potassium sulfate ($K_2SO_4$) was removed by filtration. The wet cake of sodium carbonate monohydrate ($Na_2CO_3.H_2O$) and potassium sulfate ($K_2SO_4$), containing 55% of mother liquor on a dry basis, was washed at 75° C. to redissolve the potassium sulfate ($K_2SO_4$), in a countercurrent decantation apparatus with an amount of 30% sodium carbonate ($Na_2CO_3$) solution equal to 2 times the weight of the cake. The sodium carbonate ($Na_2CO_3$) produced by calcination of the washed product contained only 0.4% $K_2O$ and 0.2% $SO_3$. The effluent wash solution was carbonated at 55° C., the resulting precipitated mixture of sodium bicarbonate and trona was removed by filtration at 25° C., and calcined to give sodium carbonate ($Na_2CO_3$) containing only 0.1% $K_2O$ and 0.05% $SO_3$. The sulphate-containing filtrate was mixed with 50% potassium carbonate ($K_2CO_3$) solution in the proportion of 0.60 parts of potassium carbonate ($K_2CO_3$) solution to one part of filtrate and evaporated at 100° C. until the composition of the solution reached 47.0% potassium carbonate ($K_2CO_3$), 7.0% sodium carbonate ($Na_2CO_3$), and 0.1% potassium sulfate ($K_2SO_4$). The potassium sulfate ($K_2SO_4$) which crystallized was removed by filtration and found to contain only 0.6% $Na_2O$ and 1% $CO_2$.

It will be apparent from the foregoing description and illustrative examples, that a simple and practicable way to separate potassium sulphate from a mixture of sodium carbonate and potassium carbonate has been provided. The invention has great utility in the separation of small amounts of potassium sulphate from large amounts of sodium carbonate and potassium carbonate, but it is not restricted thereto. As will be apparent from the foregoing, there are no substantial losses involved in the process, and the materials employed are already available from previous operations.

Although the invention has been described as a batch operation, obviously a continuous operation is entirely feasible, and it is therefore contemplated within the scope of the invention. The various crystallization, filtration and evaporation steps can be continuously carried out in equipment known to the art. Thus, for example, the initial brine is passed in sequence through an evaporative crystallizer, thence through a filtering stage, a second evaporative crystallizer, a second filtration stage, the wet cake resulting is passed through a counter-current washer, again filtered, the wash liquor passed through a carbonator, a filter, and then through a final crystallization stage to recover the potassium sulphate.

Since many apparently differing embodiments of the invention will occur to one skilled in the art, various changes can be made in the invention without departing from the spirit and scope thereof.

What is claimed is:

1. A process for removing alkali sulfate from mixtures thereof with sodium and potassium carbonates which comprises precipitating and recovering sulfate-free sodium carbonate monohydrate by evaporation of an aqueous solution of such a mixture at about 100 degrees centigrade until the weight ratio of sodium carbonate to potassium carbonate in solution approaches 2 to 1, then precipitating and separating sulfate-containing alkali carbonates by continuing the evaporation of said solution at about 100 degrees centigrade until substantially all of the sulfate has been precipitated, whereby a mother liquor low in sulfate is obtained, then extracting said alkali sulfate by washing said sulfate-containing precipitate at a temperature of about 60 degrees centigrade with about 0.69 part by weight of 30 percent sodium carbonate solution per part by weight of precipitate, thus yielding a sulfate-free sodium carbonate residue, then precipitating sodium salts as sodium bicarbonate and trona by treatment of said wash solution at 55 degrees centigrade with carbon dioxide, removing the precipitate from the carbonated wash solution, then repressing glaserite formation during subsequent evaporation by the addition to the filtrate of between 0.5 part by weight and 0.75 part by weight of approximately saturated potassium carbonate solution per part by weight of filtrate, and finally precipitating substantially all of the contained potassium sulfate in crystalline form by evaporating the fortified filtrate at a temperature between about 60 degrees centigrade and 85 degrees centigrade whereby a potassium carbonate solution low in sulfate is recovered for further working up.

2. A process for removing potassium sulfate from an aqueous solution thereof with sodium and potassium carbonates which comprises the steps of evaporating the solution at a temperature of at least 35 degrees centigrade to precipitate sodium carbonate crystals and recovering the crystals; then further evaporating at a temperature of at least 35 degrees centigrade to precipitate alkali metal sulfate admixed with carbonates and separating and recovering the crystals and a mother liquor low in sulfate and rich in potash; then extracting the alkali sulfate-containing precipitate with hot concentrated sodium carbonate solution to obtain a sulfate-containing wash solution and separating this from a residue of sodium carbonate low in sulfate; then passing carbon dioxide into the wash solution at a temperature not higher than 65 degrees centigrade to precipitate a mixture of sodium bicarbonate and trona and separating the mother liquor from the precipitate; adding potassium carbonate to the liquor to repress glaserite formation in the subsequent step; and evaporating the liquor to crystallize out potassium sulfate and obtain as a mother liquor, potassium carbonate solution low in sulfate.

GUY ERVIN, Jr.

REFERENCES CITED

The following references are of record in the file of this patent:

UNITED STATES PATENTS

| Number | Name | Date |
| --- | --- | --- |
| 668,671 | Baker | Feb. 26, 1901 |
| 1,353,283 | Silsbee | Sept. 21, 1920 |
| 1,618,834 | Kuhnert | Feb. 22, 1927 |
| 1,393,603 | Beckman | Oct. 11, 1921 |
| 1,349,134 | Jacobi | Aug. 10, 1920 |

FOREIGN PATENTS

| Number | Country | Date |
| --- | --- | --- |
| 57,707 | Germany | July 10, 1891 |